Figure 1:
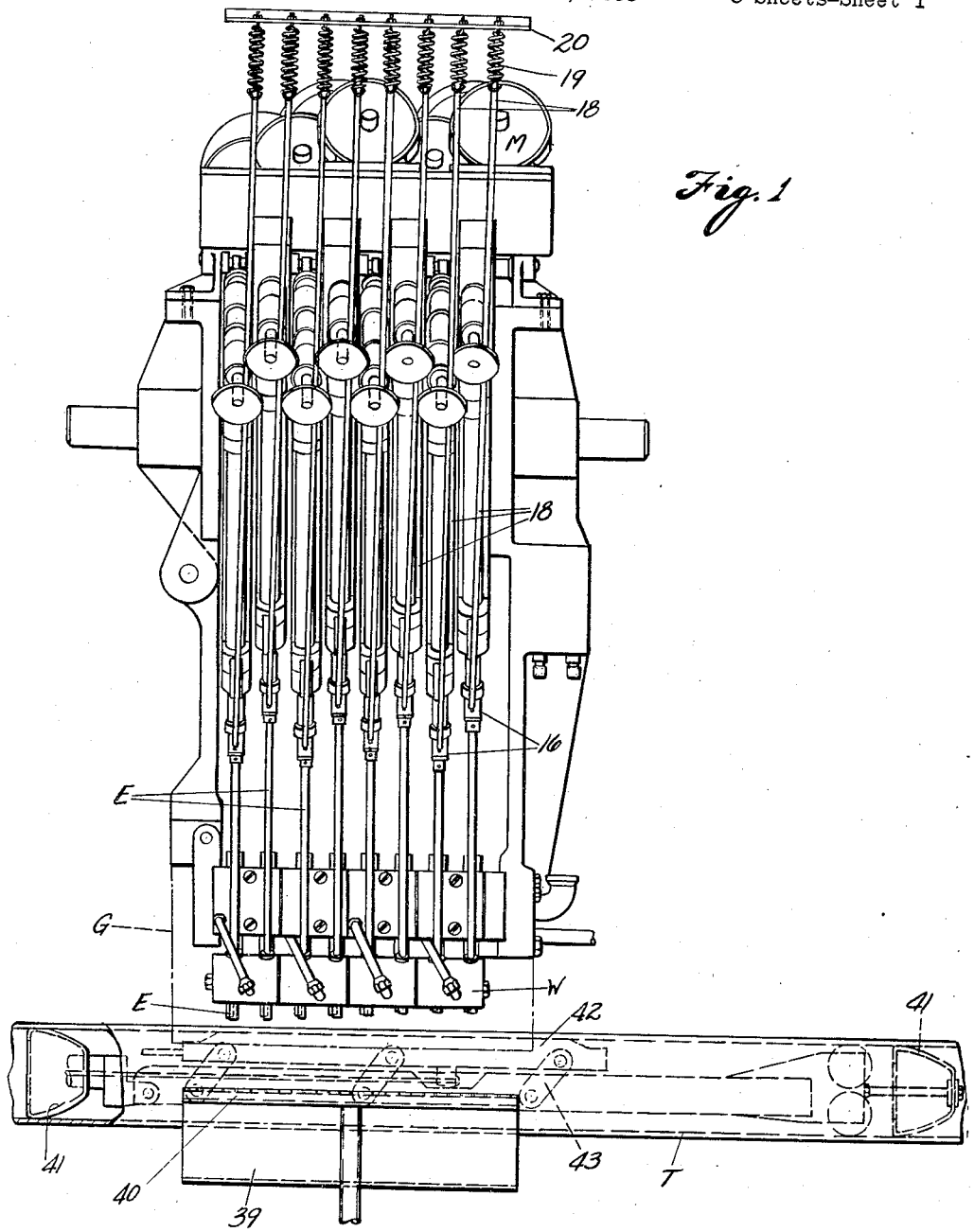

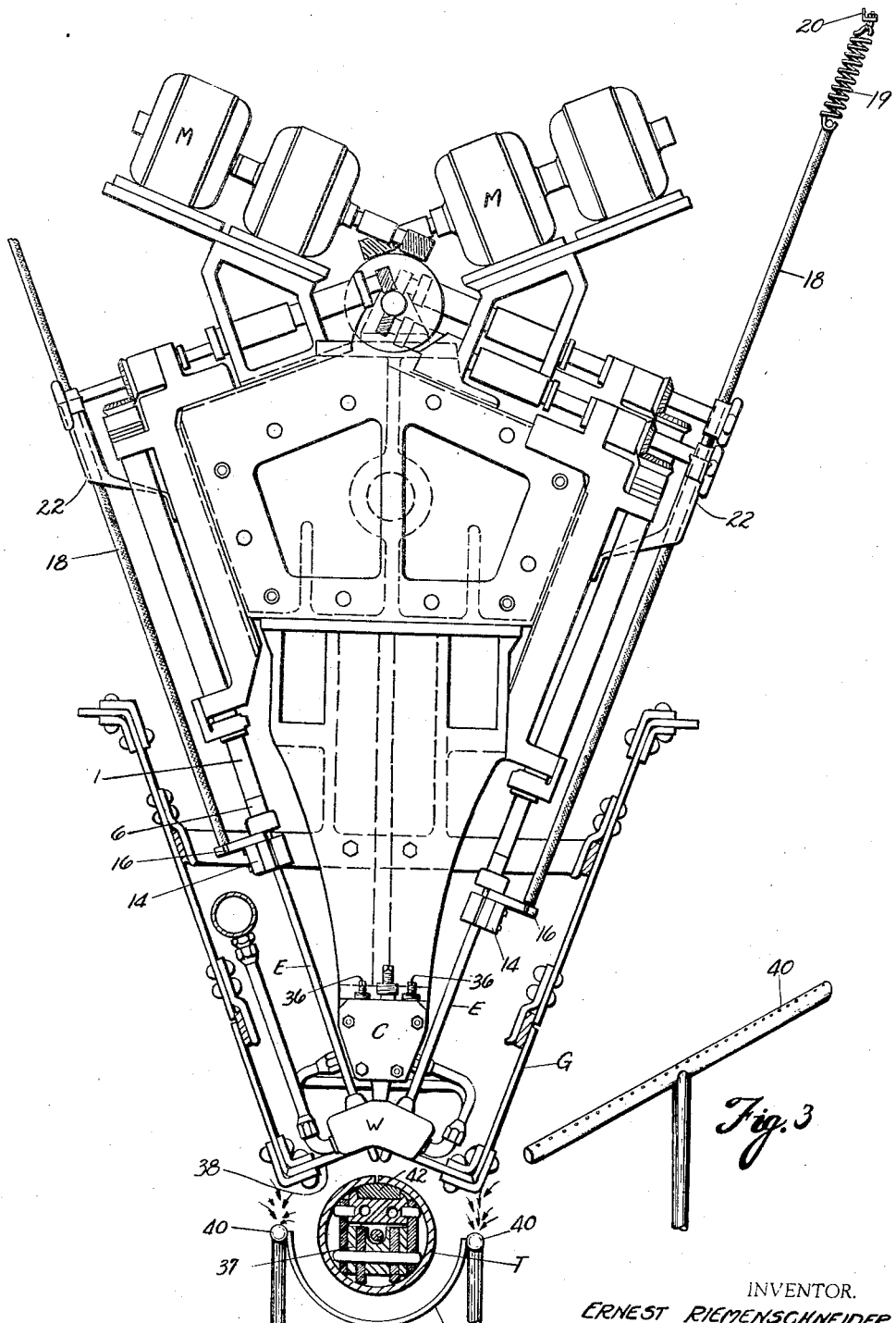

May 6, 1941. E. RIEMENSCHNEIDER 2,240,627
WELDING APPARATUS
Filed Nov. 26, 1938 3 Sheets-Sheet 3
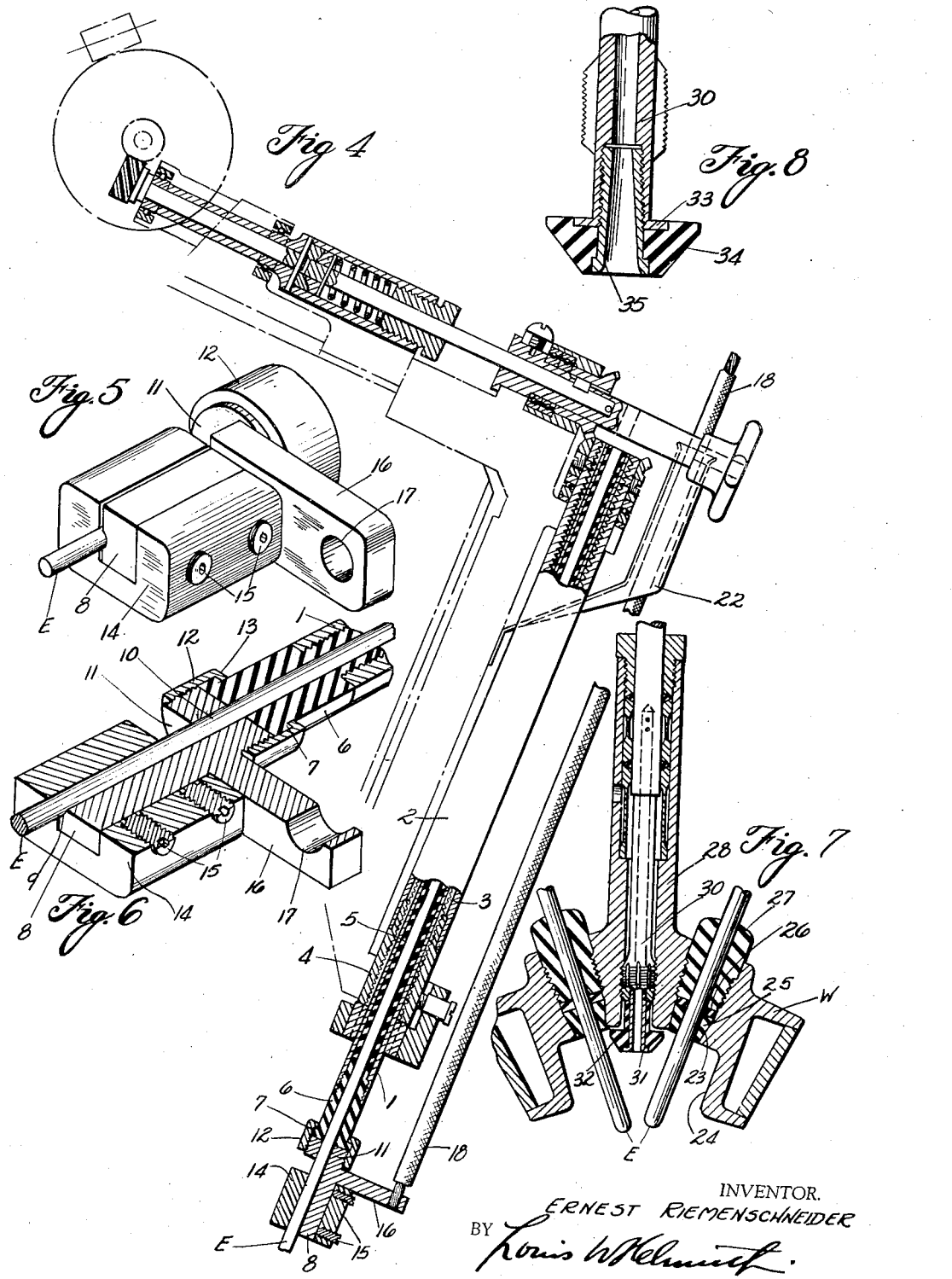
INVENTOR.
ERNEST RIEMENSCHNEIDER
BY
ATTORNEY.

Patented May 6, 1941

2,240,627

UNITED STATES PATENT OFFICE 2,240,627

WELDING APPARATUS

Ernest Riemenschneider, Lakewood, Ohio, assignor to The Midland Steel Products Company, Cleveland, Ohio, a corporation of Ohio Application November 26, 1938, Serial No. 242,537

11 Claims. (Cl. 219—14)

This invention relates to new and useful improvements in welding apparatus and an important object is to provide a conductor arrangement which prevents stressing of the conductor cables and their connections during electrode adjustments, and eliminates cable connections heretofore a source of trouble.

Another object of the invention is to provide for greater arc stability in the insulation of the electrodes from the welding head and electrode feed, as well as to prevent arcing between the electrodes and the gas feeding nozzles.

Another object of the invention is to provide means for eliminating adverse drafts and currents of air in the welding zone and to generally improve the construction shown in my prior Patent No. 2,061,671 granted November 24, 1936.

Other objects and advantages of the invention will become apparent during the course of the following description.

In the accompanying drawings forming a part of the application and wherein like numerals are employed to designate like parts throughout the several views, Fig. 1 is a side elevation of the welding head in position to weld tubing, Fig. 2 is an end elevation of the same showing the tubing and mandrel for supporting the same in section, Fig. 3 is a perspective view of the air curtain means, Fig. 4 is an enlarged section of one of the electrode holders and adjusting mechanism therefor, Fig. 5 is an enlarged perspective view of the improved conductor connection with the electrode, Fig. 6 is a similar view showing a longitudinal section of the same, Fig. 7 is an enlarged vertical section through a portion of the welding head, Fig. 8 is an enlarged vertical section of the gas-feeding nozzle in the welding head.

To improve the maintenance and efficiency of the apparatus disclosed in my former United States Letters Patent No. 2,061,671, to which reference may be had for more specific details of construction and operation of certain portions of the apparatus. means have been provided looking primarily toward greater stabilization of the welding arcs throughout long periods of operation. To obtain a uniformly sound continuous weld in the tubing T or other parts being welded, it is necessary to maintain stability of the arc created between each pair of electrodes E. As explained in the former patent, the arc voltage regulates the spacing of the arcing ends of each pair of electrodes E through appropriate controls and electrode feed mechanism including an electrode holder sleeve 1, exteriorly threaded throughout the major portion of its length as at 3. Rotatable tubes 2 are mounted in suitable bearings, upon the downwardly converging sides of the frame and as all electrode holders are all alike, a description of one will suffice for all. Each sleeve is disposed in a tube 2 and is provided with the exterior threads and keyways to cooperate with a nut 4 secured to the lower end of the tube 2 rotated by its respective motor M, for adjusting the holder up or down depending upon the voltage of the arc as explained in the aforesaid patent. Fixed to and within the electrode holder 1 is an insulating tube 5 to insulate the electrode from the metallic sleeve 1. Threaded into the lower end of the sleeve is an insulating member 6 surrounding the electrode, and this member terminates in an enlarged head or annulus 7 disposed a substantial distance from the lower end of the metallic sleeve 1. As these electrodes are consumed over a period of time and must be fed longitudinally through the electrode feeding mechanism, electric current must be brought into the electrodes adjacent their lower ends by flexible conductors. These cables must have very efficient electrical connections with the electrodes at all times to insure a uniform flow of current and maintain a uniform arc upon which a uniform weld is dependent. In the former patent, the electrodes were energized from bus bars extending longitudinally through the welding apparatus and pig-tail cable connections between the bus bars and the electrodes. This form of conduction entailed two separate connections for each electrode; one at each pig-tail conductor. Due to the movement of the electrodes during adjustment and the fact that these connections are subjected to the intense heat of the welding apparatus in spite of the provision of guards to deflect it, these pig-tail connections soon became loose and corroded, resulting in current losses during transmission, and arc fluctuations due to the fluctuations of the current. In spite of the fact that the clamps at the ends of the pig-tails attached to the electrodes were heretofore constructed of copper, nevertheless these copper clamps corroded and the cable connections became loose to the extent of causing faulty conduct of current requiring frequent repairs and replacements to maintain uniform arc performance. Arc stability is dependent upon many factors and conditions. It is important to prevent switching, flickering and extinguishment of the arcs which would prevent them from uniformly melting the edges to be welded. One of these factors, is of course, insuring a uniform uninterrupted flow of current to all of the pairs of electrodes. Another, is insuring a uniform flow and amount of hydrogen about the electrodes, so as to cause the ends of these electrodes to form into perfectly round globules of molten tungsten which remain stable and therefore keep the arcs therebetween perfectly stable. Adverse drafts of air around the welding zone also promote instability.

Some of these difficulties are overcome by providing electrode conductor clamps of special construction. Each conductor clamp comprises a body 8 of Monel metal having a groove 9 extending longitudinally thereof and in alignment with a circular opening 10 provided centrally of a circular exteriorly threaded head 11 to embrace the electrode. An interiorly threaded ferrule 12 has an inwardly extending annular flange 13 to engage over the enlarged head 7 of the insulating sleeve and is screw threaded on the head 11 of the conductor clamp. The body 8 is positioned in the slot of a C-clamp 14 with the electrode groove 9 opposite a similar groove in one jaw of the clamp. The C-clamp is provided with screws 15 which enter threaded openings in the body 8 to not only secure the C-clamps to the body 8, but to securely clamp the body and grooved jaw of the clamp in firm engagement with the electrode. This open loop C-clamp is used in place of a closed loop clamp, as the latter type sets up an inductance resulting in overheating of the connection. The body 8 of the conductor is provided with an integral lateral extension 16 having an aperture 17 adjacent its free end. Into this opening is secured by brazing or otherwise, one end of a braided conductor cable 18 which extends parallel with the electrode and is supported at its upper end by a weak coil spring 19 suspended from a bar 20 forming a common support for all of the springs supporting the several cables. This same arrangement is provided for the opposite side of the welding apparatus and the cables 18 are all bunched together at one end of the machine and lead to the electrical controls therefor. In order to retain the cables 18 spaced from the sides of the apparatus, a tubular guide 22 is provided for each cable and is secured to the side of the apparatus as illustrated in Figs. 2 and 4. This prevents the cables from sagging out into contact with the shield G which is of substantially U-shape and encloses the lower part of the apparatus to protect it against the intense heat of the arcs.

Other difficulties are overcome by providing special construction for a welding head W disposed in close proximity to the tubing T when in welding position, as shown in Figs. 1 and 2. As best seen in Fig. 7, this head is provided with a pair of internally threaded openings terminating at their inner ends in tapered portions 23 where they enter the cavity 24 of the welding head. Tapered insulating packings 25 are forced to seat in airtight fashion upon the tapered portions of the openings by means of washers 26 forced down against the packings by screws 27 of insulating material screwed into the threaded portions of said openings. The tungsten electrodes E have a sliding fit through said screws, washers and packings, and project into the cavity 24 in downwardly converging relationship as shown in Fig. 7.

Hydrogen gas is fed into the center of the cavity 24 through a nozzle 28, as set forth in my former patent. A distributor tube 30 having a longitudinal central gas passage extends through the nozzle 28. This tube at its intermediate portion is of smaller diameter than the opening in the nozzle through which it extends, so as to provide a gas passage therebetween. The lower end of this tube is enlarged and externally threaded to screw into the nozzle and is provided with longitudinal slots through the threads to permit the gas to pass between the tube and nozzle out into the central portion of cavity 24 between the two electrodes. The lower end of the gas tube is provided with interior threads to receive the upper threaded end of a ferrule 31 extending axially through the enlarged head and shank of a jet 32 of insulating material. This enlarged head of the jet is substantially a cone section and its integral tubular shank is forced against the lower end of the tube 30 when the metallic ferrule 31 is screwed into the end of the tube. As a modification of the jet construction, Fig. 8 shows the lower end of the gas tube 30 as being interiorly screw threaded and terminating in an outwardly extending annular flange 33 which seats in a depression in the enlarged insulated head 34 when a metallic ferrule 35 is threaded into the lower end of the gas tube as illustrated. In both of these forms, gas is permitted to pass axially through the jet and ferrule to be directed between the arcing ends of the electrode E while at the same time gas is caused to flow through the nozzle 28 and to enter the cavity 24 between the walls thereof and the enlarged heads of the jets to distribute a uniform quantity of gas around each electrode. The quantity of gas passing through and around the gas tube 30 is regulated by needle valves 36 in a distributing chamber C into which the nozzle 28 extends.

The tubing to be welded by the apparatus is fed over a mandrel 37 located beneath the welding head W and well up between the somewhat inverted V-shaped bottom walls 38 of the heat shield G to form a cloak over the welding zone. Beneath the tubing and the welding zone is positioned an arcuate shield 39 which is substantially co-extensive with the heat shield G. On opposite side edges, and if desired, at the opposite ends of the arcuate shield, is placed horizontal tubes which are perforated to either suck in air or to discharge air under pressure for creating curtains or drafts of air surrounding the welding zone and between the two shields. Thus, the welding zone containing a quantity of burning hydrogen is substantially isolated from surrounding atmosphere and protected against drafts which might otherwise disturb the stability of the arcs in the welding zone and even penetrate the welding zone to oxidize the weld. It has been found that drawing air into the tubes by means of connecting them with a source of suction produces the most satisfactory results in stabilizing the arcs and excluding atmosphere from the welding zone. The arrows in Fig. 2 show the curtains of air at the sides of the tubing, which curtains are drawn between the bottom of the shield G and the sides of the shield 39.

In order to exclude drafts as much as possible from the inside of the tubing being welded, cup-shaped baffles 41 of thin resilient metal are secured to the ends of the mandrel to lightly circumferentially engage the inner walls of the tubing being welded. A shoe 42 supported upon links 43 of the mandrel is urged by spring action as disclosed in my former patent to engage the underside of the seam being welded and serves as a safety factor in case the molten metal of the seam has any tendency to drop into the tubing. However, due to the control of the edges of the seam being welded, by means disclosed in my U. S. Letters Patent No. 1,948,801, the molten metal of the seam is retained upon these edges without danger of dropping through, so that the shoe structure 42 simply serves in the capacity of excluding any air within the tube from the direct path of the welding.

It is to be understood that various changes in the shape and arrangement of parts may be resorted to without departing from the spirit of the invention or the scope of the appended claims.

I claim:

1. In combination with electric welding apparatus comprising a welding head, an electrode adjustably associated therewith, an insulated electrode holder movably mounted with respect to the head for adjusting the electrode relative thereto, and a conductor secured directly to the electrode to move therewith, of a conductor cable secured to said conductor in parallel relation to the electrode and being bodily and rectilinearly movable longitudinally with the electrode to prevent flexing of the cable at the point where it is connected with the conductor during adjustments of the electrode.

2. In combination with electric welding apparatus comprising a welding head, an electrode adjustably associated therewith, an insulated electrode holder movably mounted with respect to the head for adjusting the electrode relative thereto, and a conductor secured directly to the electrode, of a conductor cable having an end secured to the said conductor and disposed in parallel relation with the electrode and being bodily movable longitudinally as a unit with the electrode.

3. Electric welding apparatus comprising a welding head, an electrode adjustably associated therewith, an insulated electrode holder movably mounted with respect to the head for adjusting the electrode relative thereto and terminating in an enlarged head, a conductor secured to the electrode, a collar threadedly connected to the conductor and embracing the enlarged head of the holder, and a bodily movable conductor cable secured to said conductor parallel with the electrode.

4. Electric welding apparatus comprising a welding head, an electrode adjustably associated therewith, an insulated electrode holder movably mounted with respect to the head for adjusting the electrode relative thereto, a conductor clamp secured to the electrode, and a conductor cable secured to said conductor and resiliently supported parallel to the electrode to move as a unit with the electrode to prevent bending of the cable.

5. A conductor clamp comprising a conductor body having a longitudinal groove aligned with an aperture in an enlarged threaded head by which the clamp is supported, a welding electrode received in said groove and perforation, said body having a laterally extending integral arm provided with an opening, a flexible conductor cable secured in said opening, a C-clamp having a groove to clamp the electrode against a wall of the groove in said conductor body and engaging the elongated body, and means for detachably connecting the C-clamp with the conductor body.

6. Electric welding apparatus comprising a support having downwardly converging sides, a pair of electrodes adjustably associated with the sides of the support and arranged in downwardly converging relationship, conductors secured to the electrodes and having outwardly extending arms, flexible conductor cables fixed to said arms and extending downwardly in converging relationship, and guides associated with the sides of the support through which the conductor cables extend to prevent excessive sagging of said cables.

7. Electric welding apparatus comprising a support with bearings, a rotatable tube having a nut at its lower end, a hollow screw operating in said tube and engaging said nut, a sleeve of insulating material in said screw extending beyond the end of the same, an insulated member screwed into said sleeve and terminating in an enlarged integral head spaced a distance from the end of the screw, an electrode in said insulating sleeve, a conductor secured to the electrode, and a cap secured to said conductor and having a flange embracing said enlarged head to secure the conductor to said insulating sleeve.

8. In an electric welding apparatus, a guide tube, an elongated insulated electrode tube movable longitudinally of the guide tube, an electrode mounted in said electrode tube to move therewith, an electrode clamp secured to the electrode, and a conductor cable rigidly secured to the clamp and extending parallel to the guide tube to move with the electrode tube rectilinearly lengthwise of said guide tube.

9. In an electric welding apparatus, a guide tube, an elongated insulated electrode tube movable longitudinally of the guide tube, said electrode tube terminating in an enlarged head, an electrode mounted in said electrode tube to move therewith, an electrode clamp secured to the electrode and having a head of a size corresponding with said electrode tube head, a collar threadedly connected to the head of the clamp and embracing the head of the electrode tube, said clamp having an integral laterally extending arm with a perforation, and a conductor cable rigidly secured to the walls of the perforation in the clamp and extending parallel to the guide tube to move with the electrode tube rectilinearly lengthwise of said guide tube.

10. The combination with electric welding apparatus including a pair of downwardly converging sides with electrodes adjustably mounted thereon, said electrodes being adjustable lengthwise in opposite directions to maintain an arc therebetween, of means for movably suspending flexible conductor cables from points above the electrodes whereby their lower portions hang pendant and are connected to said electrodes, and means for holding said lower portions of the cables parallel with said electrodes as the electrodes and cables move bodily as a unit.

11. The combination with electric welding apparatus including a pair of downwardly converging sides with electrodes adjustably mounted thereon, said electrodes being adjustable lengthwise in opposite directions to maintain an arc therebetween, of flexible conductor cables, means for resiliently suspending said cables from points above the electrodes whereby their lower portions hang pendant and are connected to said electrodes, and guides mounted on said sides to slidably maintain in the lower portions of the cables parallel with said electrodes whereby to eliminate stress upon the connections of the conductor cables with the electrodes.

ERNEST RIEMENSCHNEIDER.